United States Patent [19]

Furukawa et al.

[11] Patent Number: 5,165,857
[45] Date of Patent: Nov. 24, 1992

[54] CENTRIFUGAL FAN

[75] Inventors: Toyoaki Furukawa; Mitsushige Goto; Hisato Arimura, all of Nagasaki, Japan

[73] Assignee: Mitsubishi Jukogyo Kabushiki Kaisha, Tokyo, Japan

[21] Appl. No.: 757,625

[22] Filed: Sep. 11, 1991

[30] Foreign Application Priority Data

Sep. 20, 1990 [JP] Japan .................. 2-98728[U]

[51] Int. Cl.$^5$ ............................................ F04D 29/34
[52] U.S. Cl. ............................ 416/204 R; 403/337; 403/365
[58] Field of Search ........... 416/204 R, 204 A, 244 R, 416/244 A, ; 403/337, 365

[56] References Cited

U.S. PATENT DOCUMENTS

| 1,430,486 | 9/1922 | Ayres | 416/204 |
|---|---|---|---|
| 2,638,761 | 5/1953 | Henry | 403/365 |
| 2,681,708 | 6/1954 | Mix | 416/204 |
| 2,754,920 | 7/1956 | Derry | 416/204 |
| 3,147,811 | 9/1964 | Klonoski | 416/204 |
| 3,912,375 | 10/1975 | Franklin, Sr. | 416/204 |
| 4,058,023 | 11/1977 | Smith | 403/337 |

Primary Examiner—John T. Kwon
Attorney, Agent, or Firm—McGlew & Tuttle

[57] ABSTRACT

An improved centrifugal fan in which a fan blade is supported by a main plate and a side plate and said main plate is connected to a rotation shaft, characterized in that between the rotation shaft and the main plate, there is interposed a doughnut-shaped connecting plate penetrated by the rotation shaft at the central part thereof, the connecting plate is fixed to the rotation shaft and to the main plate, at the inner and outer circumferential parts of the connecting plate, respectively, a plurality of through holes are provided in the inner and outer circumferential parts of the connecting plate in the circumferential directions, respectively, and slits are formed between each pair of two opposite through holes positioned obliquely with respect to the direction of radius of the connecting plate. Non-reversible displacement of the center of the fan blade is avoided which is a major factor in the vibration of the fan blade.

2 Claims, 3 Drawing Sheets

CENTRIFUGAL FAN

BACKGROUND OF THE INVENTION

1. Field of the Invention

The present invention relates to a centrifugal fan in a positive blower, an induced draft fan apparatus or the like, and more specifically, it relates to a technique for holding securely the center of a main plate for supporting blades in line with the rotational axis.

2. Description of the Related Art

FIG. 3 illustrates a conventional centrifugal fan, in which a blade 1 is supported by a main plate 2 and a side plate 3, and said main plate 2 is connected to the rotation shaft 4 by means of a rivet 5.

In the above-mentioned conventional centrifugal fan, however, the main plate 2 may be deformed due to the centrifugal force caused by the rotation of the fan or by hot blast, whereby an excessively strong stress is applied to the connecting part of the main plate 2 and the rotation shaft 4. In order to give an appropriate degree of looseness to the connection, the rivets 5 are used to press the parts together. However, since no other force is applied to the connection, if the stress is greater than the pressing force, the main plate 2 can move freely in relation to the rotation shaft 4, and displacement of the center of the main plate results. This displacement of the center of the main plate has been the most important factor in the vibration of the fan due to balanced mass.

SUMMARY OF THE INVENTION

The present invention has been made for eliminating the aforementioned drawbacks of the conventional technique, and the purpose thereof is to provide a centrifugal fan in which, while relaxing the stress caused by centrifugal force and/or thermal deformation, the center of the main plate, i.e., the center of the fan blade is prevented from being displaced, so as to reduce vibrations due to unbalanced mass.

In order to resolve the above-mentioned problem, the present invention provides a centrifugal fan in which a fan blade is supported by a side plate and a main plate which is connected to a rotation shaft, which centrifugal fan is contrived in such a manner that between the rotation shaft and the main plate there is interposed a doughnut-shaped connecting plate penetrated through by said rotation shaft at the central part thereof, the inner and outer circumferential parts of the connecting part being fastened, respectively, to the rotation shaft and the main plate by means of bolts, a plurality of through holes being provided in the inner and outer circumferential parts of the connecting plate in the circumferential directions of the inner and outer circumferential parts, respectively, and a slit is formed between each pair of two obliquely opposite through holes in the inner and outer circumferential parts of the connecting plate.

According to the above means, there is provided a connecting plate which connects the main plate and rotation shaft supporting the fan blade and which is encircled by the through holes in the inner and outer circumferential parts thereof and the slits. This connecting plate rotates practically in the same way as a rigid body does against a centrifugal force or a thermal deformation of the centrifugal fan, and liberates the resulting stress so as to prevent excessively strong stress from being applied to the bolts. In addition, since the above rotation of the connecting plate is reversible, displacement of the center of the fan blade does not occur and no unbalancing force results. Thus, one of the main factors in the unbalanced vibration can be controlled.

DETAILED DESCRIPTION OF THE PREFERRED EMBODIMENT

In the following, an embodiment of the present invention is explained in detail with reference to FIGS. 1 and 2.

Figure 1:
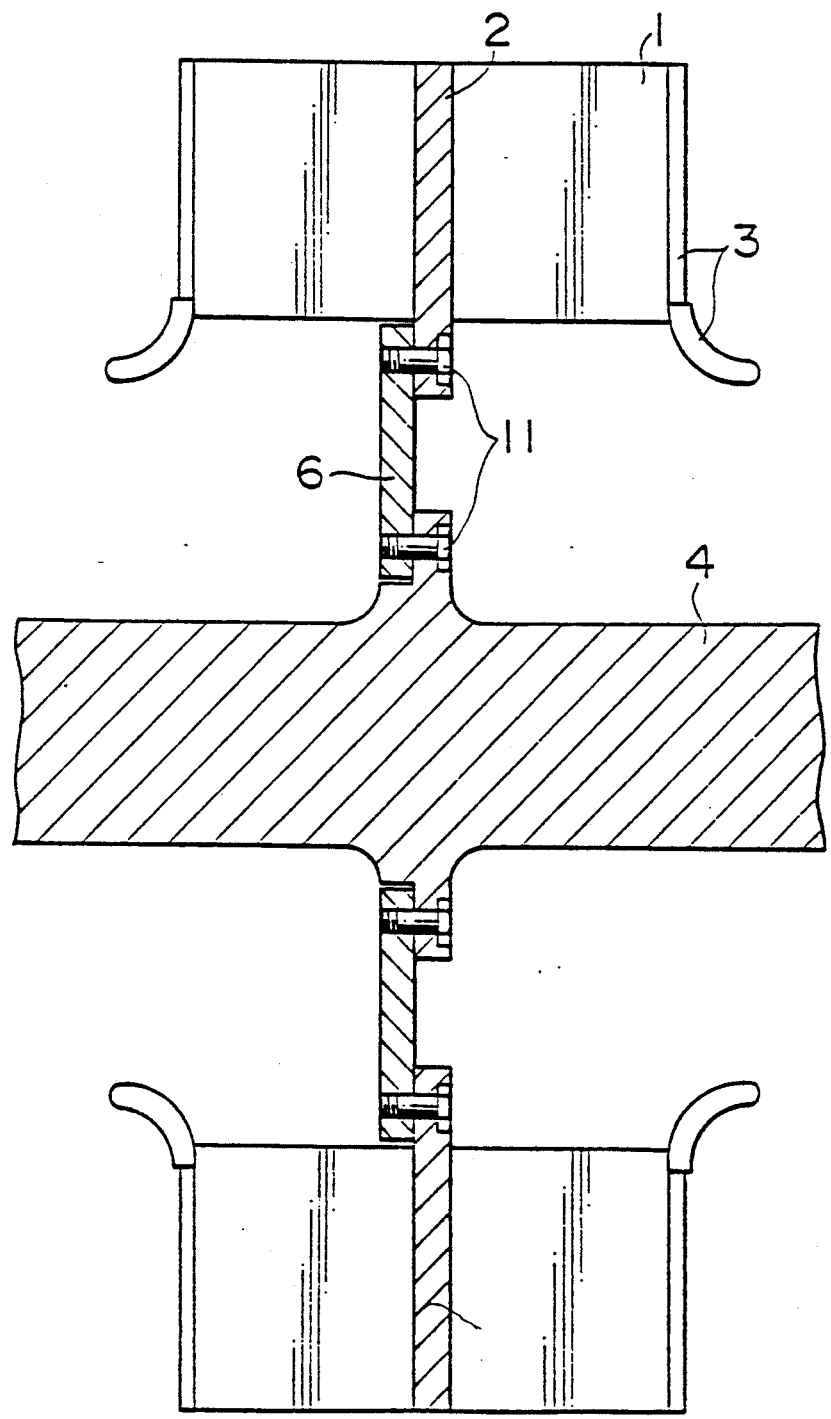
FIG. 1 is a sectional view illustrating the essential part of an example of the centrifugal fan according to the present invention.

In FIG. 1, a fan blade 1 of a centrifugal fan is supported by a main plate 2 and a side plate 3. In the present invention, a doughnut-shaped connecting plate 6 is used in order to connect the main plate 2 to a rotation shaft 4.

Figure 2:
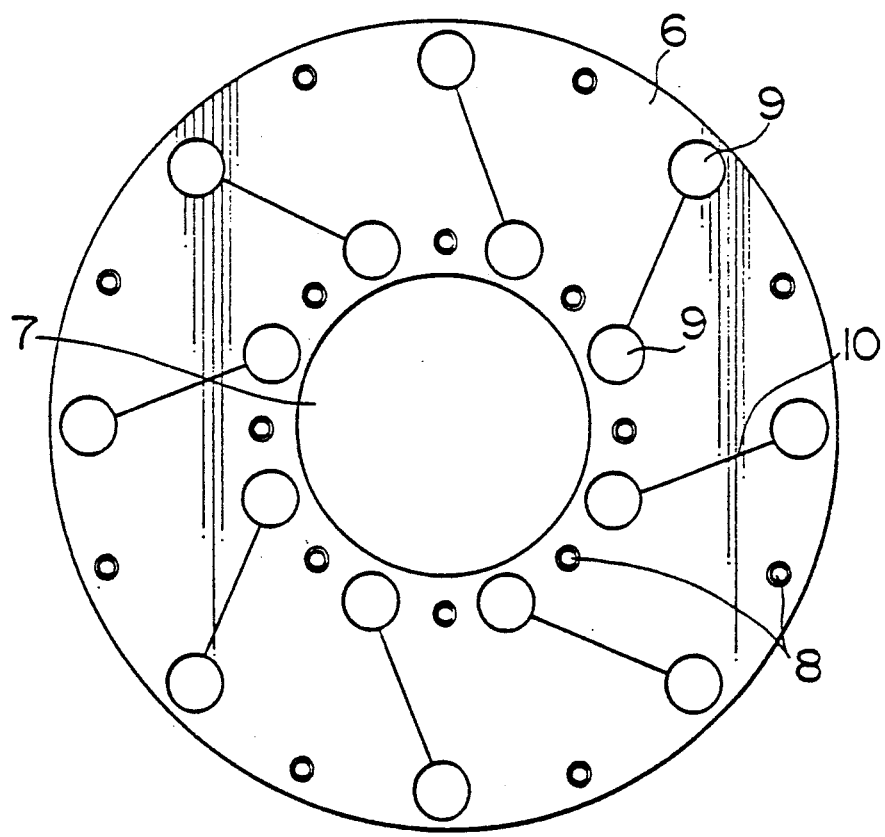
FIG. 2 is a front view illustrating an example of the connecting plate used in the present invention.
Figure 3:
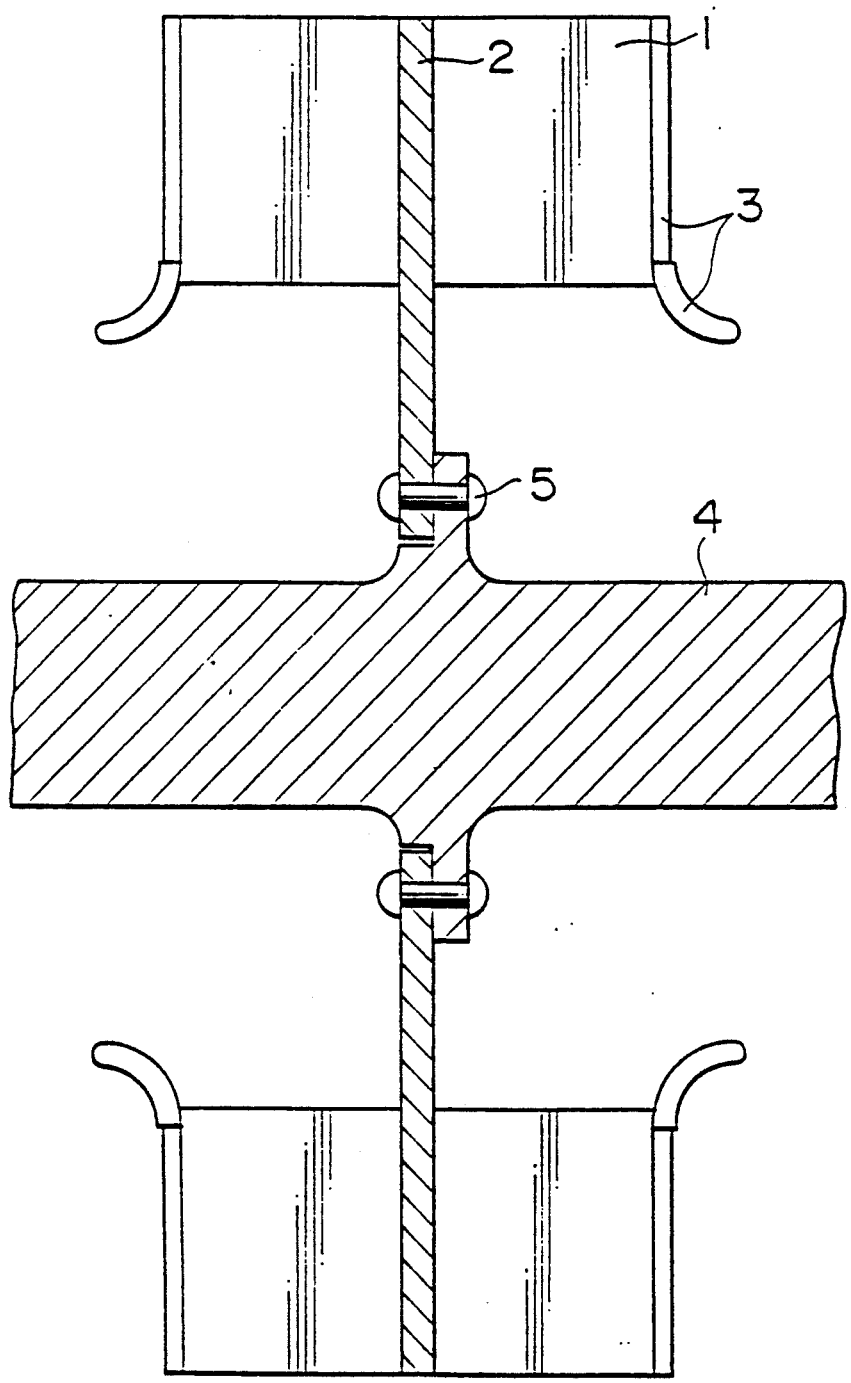
FIG. 3 is a sectional view of the essential part of a conventional centrifugal fan.

That is, in the present embodiment, this doughnut-shaped connecting plate 6 has, at its central part, a central hole 7 through which the rotation shaft 4 is inserted, as illustrated in detail, especially in FIG. 2. Furthermore, on the inner and outer circumferential parts of the connecting plate 6, there are alternately provided a plurality of bolt holes 8 and a plurality of through holes 9 which have a diameter considerably larger than that of the bolt holes 8, which bolt holes and through holes are arranged in the inner and outer circumferential directions. In addition, no two bolt holes 8 and 8 in the outer and inner part of the connecting plate 6, respectively, as well as no two through holes 9 and 9 in the two respective parts of the connecting plate, are arranged in such a manner that the two aline in the radial direction. Furthermore, in the connecting plate 6, narrow slits 10 are formed between a through hole 9 in the outer part and another through hole 9 in the inner part which are positioned opposite to each other obliquely with regard to the radial direction. As shown in FIG. 1, the connecting plate 6 with such a configuration as mentioned above is fastened, by means of bolts 11 screwed into the bolt holes 8, to the rotation shaft 4 and the main plate 2 at the inner and outer circumferential parts the connecting plate, respectively.

As described above, in the inner and outer parts of the doughnut-shaped connecting plate 6 which connects the main plate 2 supporting the fan blade 1 and the rotation shaft 4 the centrifugal fan; i.e., in the portion facing the main plate 2 and that facing the rotation shaft 4, the through holes 9's are provided in order to reduce the stress occurring at the time of deformation of the connecting plate, and also oblique slits 10's are formed between each pair of opposite through holes 9's. Thus, the portion of the connecting plate 6 which is encircled by these through holes 9's and slits 10's rotates in the same way as a rigid body does, whereby liberating the stress. Since this rotation is reversible, no displacement of the center of the main plate with respect to the rotation shaft occurs, and because no force due to unbalanced mass of the main plate is generated, one of the factors for vibrations due to unbalanced mass can be controlled.

The shape of the through hole 9 is not particularly limited, but an angular shape which may invite the concentration of stress is not preferable. In addition, when the size of the through hole 9 is excessively large, problems occur regarding the strength of the connecting plate, and therefore, the size of the through holes should be defined within such a range as may be considered to be safe in the light of mechanical strength.

As described above, according to the present invention, a main plate supporting the fan blade of a centrifugal fan is connected to a rotation shaft through a doughnut-shaped connecting plate; and between each pair of opposing through holes disposed in the respective inner and outer circumferential parts of the connecting plate, there is formed a slit extending obliquely with respect to the radial direction. Thus, while moderating the effect of the stress caused by a centrifugal force and/or thermal deformation of the main plate, the center of the main plate can be securely held in such a reversible manner as always allows it return to the original state. The most important factor for vibrations due to unbalanced mass can thereby be eliminated.

We claim:
1. In a centrifugal fan in which a fan blade is supported by a main plate and a side plate and said main plate is connected to a rotation shaft, the improvement characterized in that between the rotation shaft and the main plate, there is interposed a doughnut-shaped connecting plate penetrated by the rotation shaft at the central part thereof, inner and outer circumferential parts of the connecting plate being fixed to the rotation shaft and the main plate, respectively, and a plurality of through holes are provided in the inner and outer circumferential parts of the connecting plate in circumferential directions, and slits are formed between each pair of said through holes in the inner and outer circumferential parts, through holes in said pair being opposite to each other obliquely with respect to a radial direction of said connecting plate.

2. A centrifugal fan according to claim 1, wherein said connecting plate is fixed to said rotation and said main plate by means of bolts.

* * * * *